(12) United States Patent
Schlesinger

(10) Patent No.: US 6,418,426 B1
(45) Date of Patent: Jul. 9, 2002

(54) ENHANCED TREE CONTROL FOR MULTIPLE ITEM SELECTION

(75) Inventor: Steven Jeffrey Schlesinger, Escondido, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/470,935

(22) Filed: Dec. 22, 1999

(51) Int. Cl.[7] ................................................ G06F 17/30
(52) U.S. Cl. ............................ 707/2; 707/201; 707/526
(58) Field of Search ........................... 707/2, 201, 203, 707/526

(56) References Cited

U.S. PATENT DOCUMENTS

| | | | | |
|---|---|---|---|---|
| 4,769,772 A | * | 9/1988 | Dwyer ............................ | 707/2 |
| 5,596,702 A | * | 1/1997 | Stucka et al. ................ | 345/746 |
| 5,692,180 A | * | 11/1997 | Lee .............................. | 707/10 |
| 5,706,452 A | * | 1/1998 | Ivanov ......................... | 345/751 |
| 5,844,553 A | * | 12/1998 | Hao et al. ..................... | 345/733 |
| 6,006,281 A | * | 12/1999 | Edmunds ....................... | 707/1 |
| 6,064,943 A | * | 5/2000 | Clark et al. .................... | 702/2 |
| 6,065,002 A | * | 5/2000 | Knotts et al. ................ | 345/700 |
| 6,167,405 A | * | 12/2000 | Rosensteel et al. ......... | 707/102 |

* cited by examiner

Primary Examiner—Wayne Amsbury
(74) Attorney, Agent, or Firm—Gates & Cooper

(57) ABSTRACT

The present invention discloses a method, apparatus, and article of manufacture for selecting multiple items in a hierarchy having two or more levels. Preferably, the hierarchy comprises at least one replication group, wherein the items are replicatable on systems and the replication group comprises a set of rules governing the replication of items on systems. The method comprises the steps of displaying a hierarchy of multiple items on a monitor connected to a computer; selecting two or more non-adjacent items in the hierarchy; and displaying graphical information on the monitor. The graphical information denotes the quantity of selected items and membership of the selected items in replication groups. In addition, the graphical information and item selections are maintained when the selected items are not visible on the monitor. The displayed graphical information can be designed so as to provide the user with feedback as to the status of selected and/or non-selected items. The image of the icon can be designed to change as the status of the associated item changes. The displayed graphical information can include items that are not eligible for selection, or be limited to only those items eligible for selection.

42 Claims, 8 Drawing Sheets

ENHANCED TREE CONTROL FOR MULTIPLE ITEM SELECTION

BACKGROUND OF THE INVENTION

1. Field of the Invention

This invention relates generally to tree control for items in hierarchical systems, and in particular, to a method, apparatus and article of manufacture for selecting multiple, non-adjacent items in a hierarchy and providing graphical feedback to the user on the state of the item selection.

2. Description of Related Art

Computer systems frequently organize data as hierarchical information structures. An example is a file system provided by a typical operating system. Usually, a file system contains a root directory, which consists of files and sub-directories. Each sub-directory also contains files and lower-level sub-directories. To aid a user in navigating between files and sub-directories, hierarchical structures are represented graphically as trees.

Relational database management systems (RDBMS) store data into tables. It is helpful if a user interface for an RDBMS represents hierarchical data therein in a tree-like manner. For example, the relationships between tables in a relational database, or the relationships between relational databases, may be hierarchical in nature. This is especially true when using replication services to create and/or maintain multiple copies of tables and/or databases.

Generally, a replication service creates copies of tables and/or databases from a primary system on one or more subscriber systems. The replication service feeds updates on the primary system to the subscriber systems on a continual basis.

During the execution of user dialogs that support various commands, the user may need to select from a large set of tables to participate in the command. Capabilities desired by the user include: organizing tables into a hierarchy that shows how tables are members of databases; selecting multiple items (e.g., tables); graphical information indicating membership of tables in replication groups; graphical information indicating how many tables in a database have been selected; and maintenance of table selection when database nodes are collapsed and tables are not visible.

However, the available controls for replication services do not provide all of the above capabilities simultaneously. Thus, there is a need in the art for a method of selecting multiple, non-adjacent items in a hierarchy in a manner that provides feedback to the user on selection status for both visible and collapsed nodes.

SUMMARY OF THE INVENTION

To overcome the limitations in the prior art described above, and to overcome other limitations that will become apparent upon reading and understanding the present specification, the present invention discloses a method, apparatus, and article of manufacture for a fractal nested layout in a hierarchical system The present invention displays a visual hierarchy of items on a monitor connected to a computer. The items in the hierarchy can comprise either nodes or leaf items. Node items are, for example, directories, folders and databases. Examples of leaf items include files, tables, objects, documents, and spreadsheets. The hierarchy can include, for example, a higher level node in the hierarchy and several lower level nodes within an area of the higher level node. Lower level nodes are either expanded or collapsed. The collapsed nodes conceal their contents and the expanded nodes disclose their contents. The expanded nodes can contain several layers of lower level nodes that are visually formatted like the higher level nodes.

The invention provides a method, apparatus and article of manufacture for controlling the selection of items in a multi-level hierarchy in a computer. The method comprises displaying a hierarchy representing a replication group on a monitor connected to a computer, wherein the hierarchy is comprised of a root group node, at least one database node within the root group node, and at least one table sub-node within the database node, and wherein the replication group comprises a set of rules governing replication of tables represented by the table sub-nodes across a plurality of computer systems. The method further comprises selecting one or more database nodes and one or more table sub-nodes from the hierarchy to identify the databases and tables upon which an action is to be performed across the plurality of computer systems; updating the displayed hierarchy to denote the selected database nodes and table sub-nodes; and performing an action on the databases and tables represented by the selected database nodes and table sub-nodes in the displayed hierarchy across the plurality of computer systems. The method further comprises feeding updates to the databases and tables acted upon and represented by the selected database nodes and table sub-nodes in the displayed hierarchy on a continual basis. In one embodiment, the action performed on the databases and tables comprises initiation, termination, resumption or suspension of replication services. The invention additionally provides a method, apparatus and article of manufacture for selecting multiple items in a hierarchy having two or more levels as well as a method, apparatus and article of manufacture for displaying multiple selected items of a hierarchy. Preferably, the hierarchy comprises at least one replication group, wherein the items are replicatable on systems and the replication group comprises a set of rules governing the replication of items on systems. In one embodiment, the method comprises the steps of displaying a hierarchy of multiple items on a monitor connected to a computer, selecting two or more non-adjacent items in the hierarchy, and displaying graphical information on the monitor. The graphical information denotes the quantity of selected items and membership of the selected items in replication groups. In addition, the graphical information and item selections are maintained when the selected items are not visible on the monitor.

The displayed graphical information can be designed so as to provide the user with feedback as to the status of selected and/or non-selected items. The image of the icon can be designed to change as the status of the associated item changes. For example, in one embodiment, the displayed graphical information comprises a table icon that represents a table. The table icon can be designed to change when the represented table is selected. In another embodiment, the displayed graphical information comprises a database icon that represents a database. The database icon can be designed to change to a first image when all items within the database are selected, and the database icon changes to a second image when at least one, but less than all, items within the database are selected and a third image when no items are selected.

The displayed graphical information can include items that are not eligible for selection, or be limited to only those items eligible for selection. In one embodiment, the items comprise tables that are members of databases, and the displayed graphical information further denotes the membership of the tables in the databases. The displayed graphical information can comprise, for example, icons and text. In one embodiment, a first icon represents a database and a second icon indicates the presence or absence of a table within the associated database. The selecting can comprise selecting a replication group. Selecting a replication group results in selecting all items that are members of the replication group. In another embodiment, the selecting comprises selecting a database. Selecting a database results in selecting all items that are members of that database. Selecting a replication group selects all the tables in all the databases under that replication group.

Various advantages and features of novelty which characterize the invention are pointed out with particularity in the claims annexed hereto and form a part hereof. However, for a better understanding of the invention and its advantages, reference should be made to the drawings which form a further part hereof, and to accompanying descriptive matter, in which there is illustrated and described specific examples in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
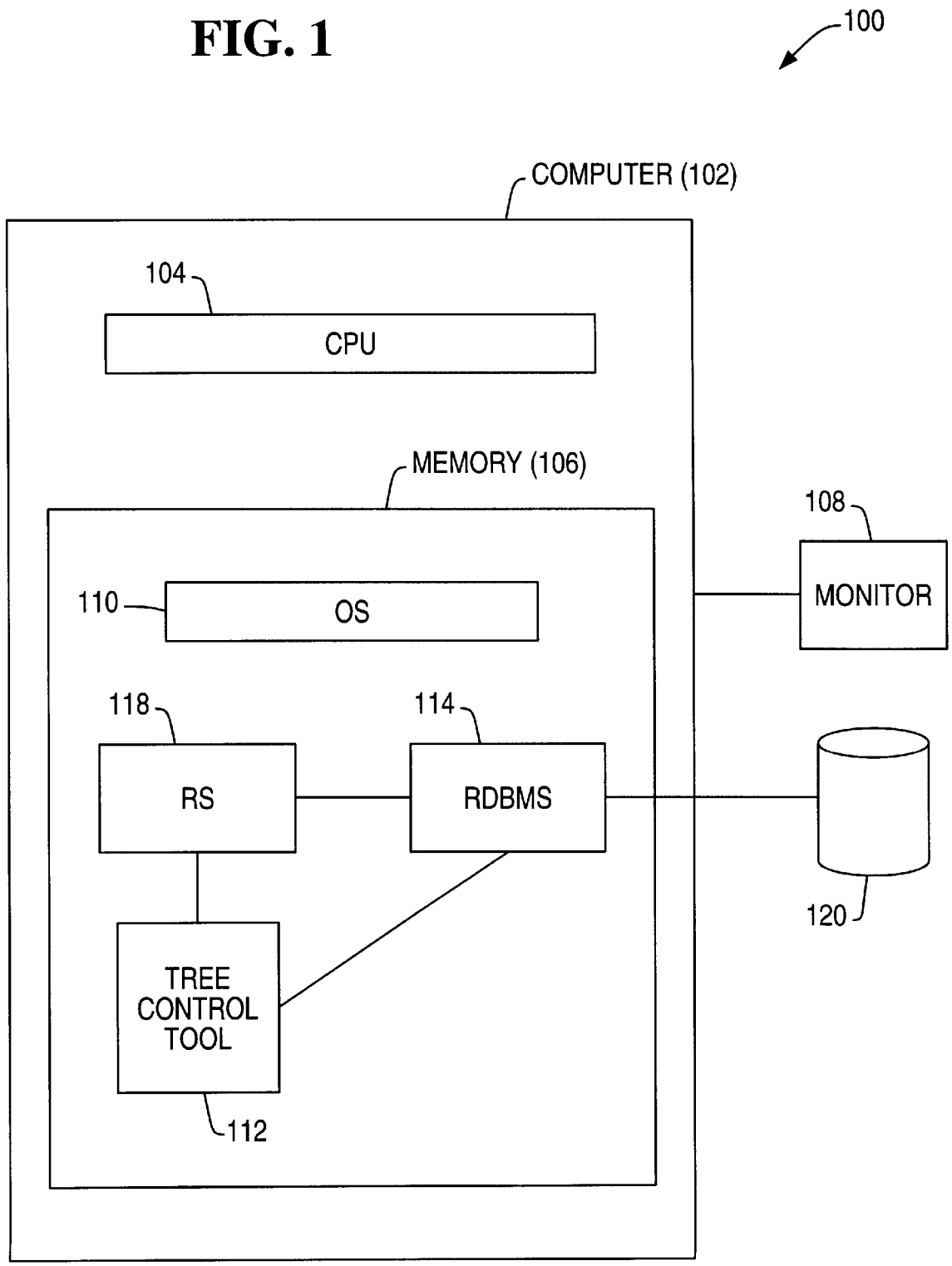
FIG. 1 illustrates an exemplary computer system that could be used to implement the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention comprises a tree control tool for displaying hierarchical information structures and selecting multiple items in a hierarchy. More specifically, this tree control tool provides a capability for selecting multiple items in a hierarchy containing at least one replication group. In the present invention, the hierarchy is comprised of items (e.g., nodes or leaf items) at a plurality of levels, wherein each level includes a set of nodes or leaf items, and each node may contain a plurality of subnodes. Each subnode itself may contain a plurality of levels, wherein each of the levels may contain a plurality of subnodes. Node items are, for example, directories, folders and databases. Examples of leaf items include files, tables, objects, documents, and spreadsheets.

A node is displayed either in a collapsed or expanded manner. A collapsed node hides its contents; an expanded node shows its contents, which are its subnodes. The subnodes of an expanded node may themselves be displayed in a collapsed or expanded manner, as desired, on an individual basis. Alternatively, a node can be displayed in another format, such as a window, list or outline embedded in the expanded hierarchy. The user may zoom and fan the hierarchy. As subnodes are expanded, they themselves become nodes and thus show their contents as subnodes. In this manner, the user may "drill down" through the one or more levels at a time, until the lowest possible level in the hierarchy is itself displayed.

Nodes may also be links to other nodes. In the linked case, the linked nodes are followed. Any loops (expanding the same node twice) may be terminated by not expanding the node. This option may be exercised by the user or by a pre-determined configuration.

Incidentally, nodes need not be homogenous in their representation. For instance, it is possible to mix objects and folders in a single hierarchy.

One environment, to which the present invention is particularly suited, is in a replication services graphical user interface (RSGUI). Such an RSGUI provides an easy to use interface for the commands to administer a system of replication services. During the execution of the user dialogs that support the replication services (RS) commands, the user needs to select from a possibly large set of tables to participate in the command. The tables are grouped into databases. The user dialogs are built from software components called controls.

The controls of the present invention provide the capability to organize tables into a hierarchy that shows how tables are members of databases, to allow selection of multiple items (ie tables), to provide graphical information to the user that denotes the membership of tables in replication groups, to provide graphical information on how many tables in a database have been selected, and to maintain table selection when database nodes are collapsed and tables are not visible.

In the dialog to add tables to a replication group, the user needs to choose some tables from all the tables on the primary system. The set of tables belongs to databases. There can be numerous tables and numerous databases. Because they are organized hierarchically, a tree control is a natural manner of presenting the data to the user. Standard tree controls support selection of only a single item. Selecting another item will cause the first item to be deselected. In contrast, the tree control of the invention provides the ability to select multiple items in many places in the tree structure, and it preserves the selection independently of the visibility of the selected nodes. The system of the invention also provides feedback to the user on selection status for collapsed nodes. These enhancements give better information on the state of the selections in the tree and status of collapsed, and therefore invisible, tree nodes.

Hardware Environment

FIG. 1 illustrates an exemplary computer system 100 that could be used to implement the present invention. The computer 102 comprises a processor 104 and random access memory (RAM) 106. The computer 102 may be coupled to other devices, such as a monitor 108, a keyboard, a mouse device, a printer, etc. Of course, those skilled in the art will recognize that any combination of the above components, or any number of different components, peripherals, and other devices, may be used with the computer 102.

Generally, the computer 102 operates under the control of an operating system 110 stored in the memory 106. The present invention is preferably implemented using one or more data structures and computer programs operating under the control of the operating system 110. More specifically, the present invention comprises a tree control tool 112 which operates under the control of the operating system 110. This tree control tool 112 cooperates with a relational database management system (RDBMS) 114 and a replication system (RS) 118.

In the preferred embodiment, the operating system 110, the tree control tool 112, the RDBMS 114, and the RS 118 are usually implemented using logic and/or data embodied in or accessible from a device, media, carrier, or signal, e.g., a processor 104, memory 106, data storage devices 120, data communications devices (not shown), or other devices connected directly or indirectly to the computer 102. This logic and/or data, when invoked, executed, and/or interpreted, causes the steps necessary to implement and/or use the present invention to be performed.

Thus, the present invention may be implemented as a method, apparatus, or article of manufacture using standard software and/or hardware engineering techniques to produce hardware, software, or any combination thereof. The term "article of manufacture" as used herein is intended to encompass logic and/or data performing similar functions that is embodied in or accessible from any device, carrier, media, or signal.

Of course, those skilled in the art will recognize many modifications may be made to this configuration without departing from the scope of the present invention. For example, those skilled in the art will recognize that any combination of the above components, or any number of different components, including different hardware environments, different software environments, different logic, different data, etc., may be used to implement the present invention, so long as similar functions are performed thereby.

Tree Control Tool

Figure 2:
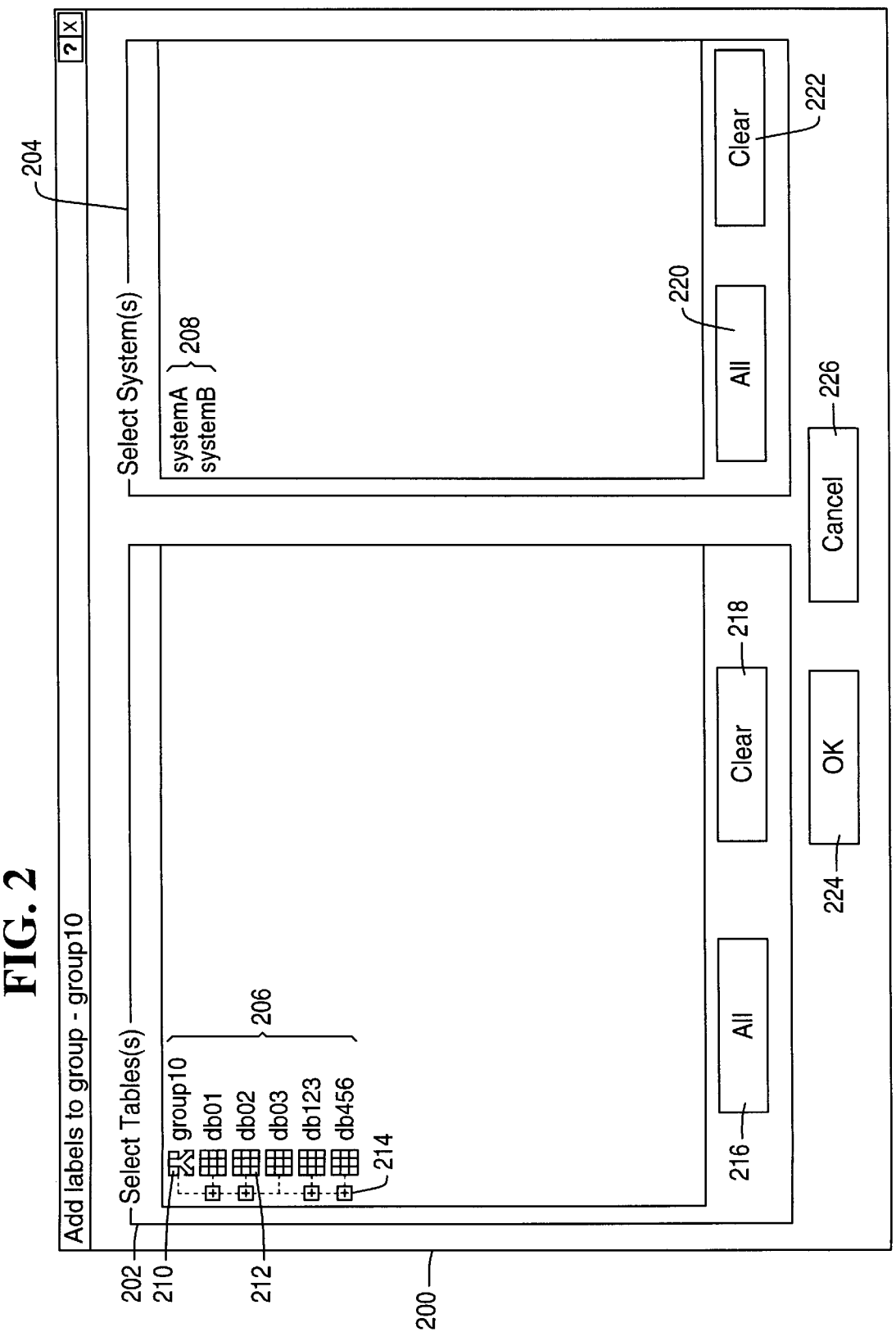
FIG. 2 illustrates the initial appearance of a dialog window with enhanced tree control according to the present invention.

FIG. 2 illustrates the initial appearance of a dialog box 200 as it would be displayed on the monitor 108 according to the preferred embodiment of the present invention. This dialog box 200 is used by the tree control tool 112 to control the operation of the RDBMS 114 and other components (including RDBMS's and components on remote systems) in managing one or more replication groups. The dialog box 200 includes two selection windows 202 and 204, wherein selection window 202 displays a tree control 206 that is used to select databases and tables for a replication group, and selection window 204 displays a list 208 that is used to select systems for the replication services.

In the example of FIG. 2, the tree control display 206 of selection window 202 is ordered hierarchically, wherein a group icon 210 identifies a group root node labeled as "group10" and subservient database icons 212 identify a plurality of database nodes labeled as "db01", "db02", "db03", "db123", and "db456", respectively. Note that the group icon 210 is an aesthetic icon comprised of various visual sub-components, and the database icons 212 are square icons comprised of sub-squares (i.e., 9 sub-squares within the square).

A "+" element 214 of the tree control display 206 located next to some of the database icons 212 (i.e., those labeled as "db01", "db02", "db123", and "db456") is used to indicate that these nodes in the hierarchy include one or more subnodes (not shown) representing tables. The "+" element 214 may be selected to display (expand) and/or hide (collapse) the subnodes representing tables. Similarly, the group icon 210 that identifies the group labeled as "group10" may be selected to display and/or hide the database icons 212. Each of the elements present in the tree control display 206 may or may not be selected for the replication services, as described in more detail below.

Also in the example of FIG. 2, the list 208 of selection window 204 is ordered sequentially, wherein the list includes identifiers of local and/or remote computer systems that are available for use by the replication services. Each of the systems present in the list 208 may or may not be selected for the replication services, as described in more detail below.

From the initial state of the tree control tool 112, the user can take several actions. The user can select and/or de-select group root nodes, database nodes, table subnodes, and listed systems, by selecting the various icons and other elements displayed in the dialog box 200. Of course, the selection and/or de-selection of systems in the list 208 of the window 204 is rather straightforward, wherein the selected and de-selected systems are distinguished visually (e.g., using reverse-video, colors, fonts, text, graphical elements, or other methods known in the art). However, while the selection and/or de-selection of group root nodes, database nodes and table sub-nodes in the tree control display 206 of the window 202 also can be rather straightforward, wherein the selected and de-selected nodes and sub-nodes are distinguished visually (e.g., using reverse-video, colors, fonts, text, graphical elements, or other methods known in the art), a number of novel functions are provided. These novel functions are described in more detail below.

The dialog box 200 shown in FIG. 2 additionally offers buttons 216–226 to facilitate the selection and de-selection processes. To select all eligible tables in the tree control display 206, a user can click on button 216. To clear all selections in the display 206, a user can click on button 218. Likewise, buttons 220 and 222 associated with selection window 204 can be used to select all systems or to clear all system selections, respectively. To implement all actions performed in dialog box 200, a user can click on the OK button 224. Alternatively, the actions can be canceled by clicking on button 226.

Figure 3:
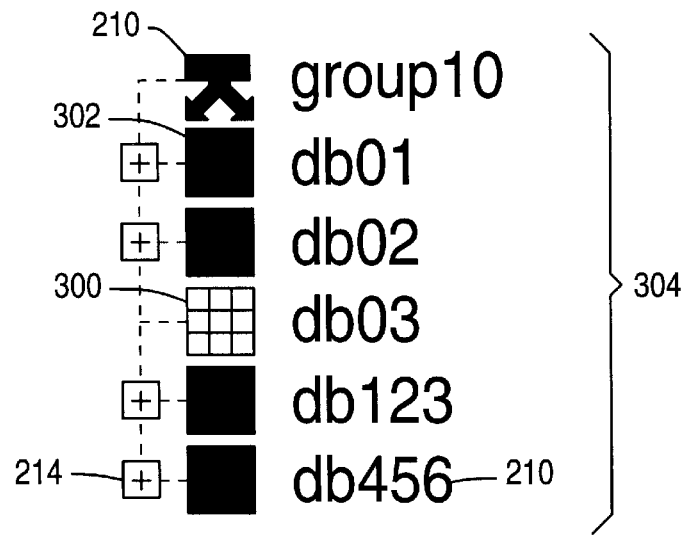
FIG. 3 illustrates tree control with all tables selected according to the present invention.

FIG. 3 illustrates the appearance of the tree control display 304 after all the tables in the database icons 302 have been selected (i.e., those labeled as "db01", "db02", "db123", and "db456", respectively. Note that the visual representations of the database icons 302 differ from database icon 300, in that the database icons 302 are opaque. The database represented by database icon 300 (i.e., the one labeled as "db03") contains no tables, and therefore, database icon 300 is transparent (in that its component sub-squares are visible). Note also that the visual representation of the group icon 210 is opaque, signaling that all eligible tables in all databases have been selected for the replication services (a transparent group icon 210 would indicate that no databases had been selected for replication services).

Optionally, coloration can be used to denote the nature of the applied commands. For example, when the tree control is used in the context of a command that adds tables (or initiates actions), the coloration can be green. When the tree control is used in the context of a command that removes tables (or terminates actions), the coloration can be red.

Figure 4:
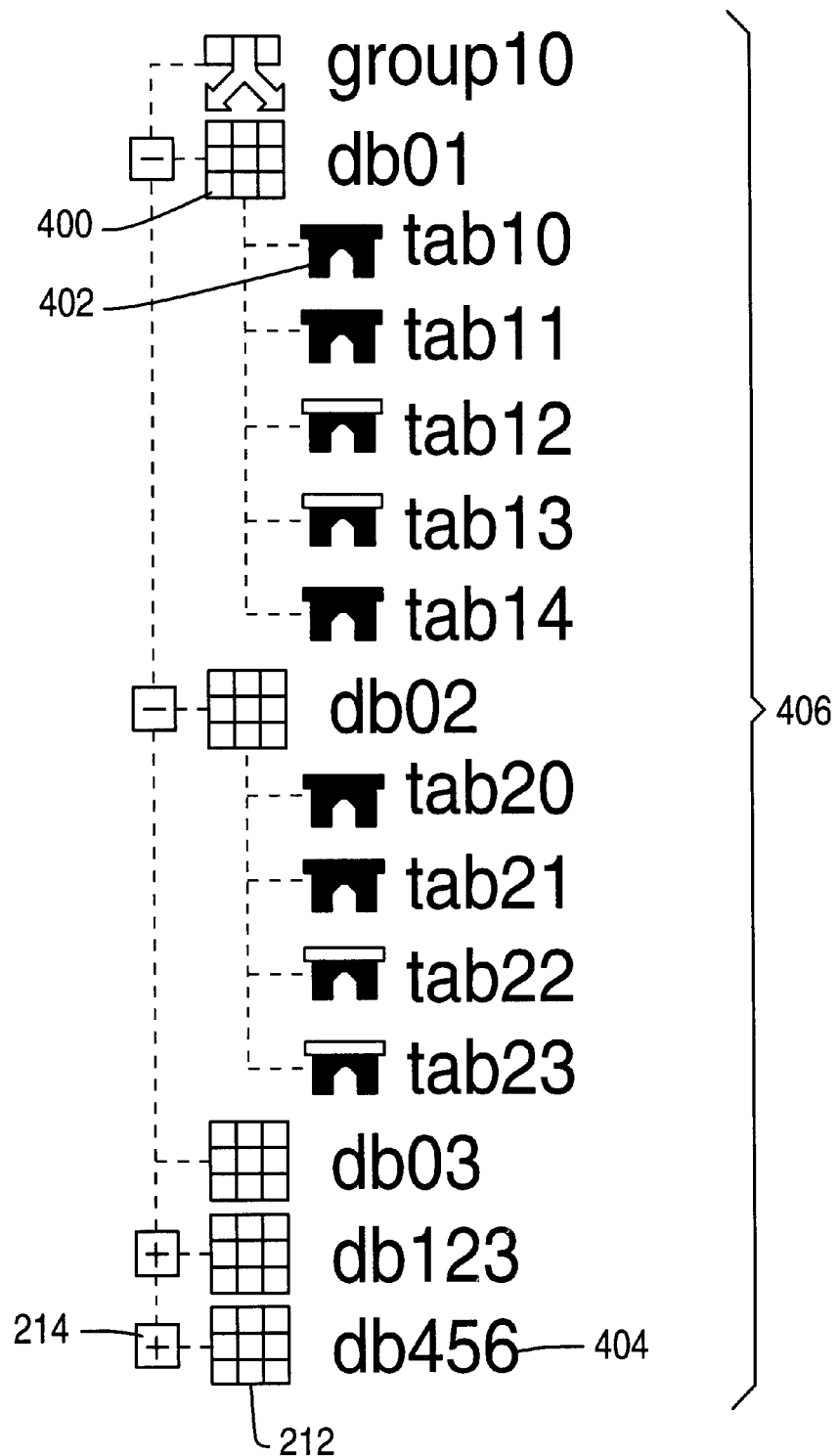
FIG. 4 illustrates tree control with database nodes expanded according to the present invention.

The user can expand the databases in the replication group to see the tables that may be added to the group. With reference to the tree control display 406 of FIG. 4, the user expands databases by clicking on the "+" element 214 to the left of the database icon 212, or by double-clicking the database icon 212 or database name 404. FIG. 4 shows two database nodes ("db01", "db02") expanded. Once the database has been expanded, the "+" to the left of the icon 208 changes to a "−" 400. Each line (indented) under each database indicates a table in the database on the primary system for that replication group. The table icons 402 are rendered opaque or transparent to indicate the state of the associated table as to membership in that replication group. For example, the icon 402 can be opaque if the table is already a member of the group, and transparent if it is not a member of any group. Optionally, coloration can be used to indicate the state of the associated table, such as green to indicate membership in that replication group, no color if it is not a member of any group, and red if it is a member of another group.

If the table is a member of another group, the control 112 prevents the user from incorrectly selecting it, as it is not eligible for selection. The inclusion of non-eligible items in the tree control display is an optional feature.

Figure 5:
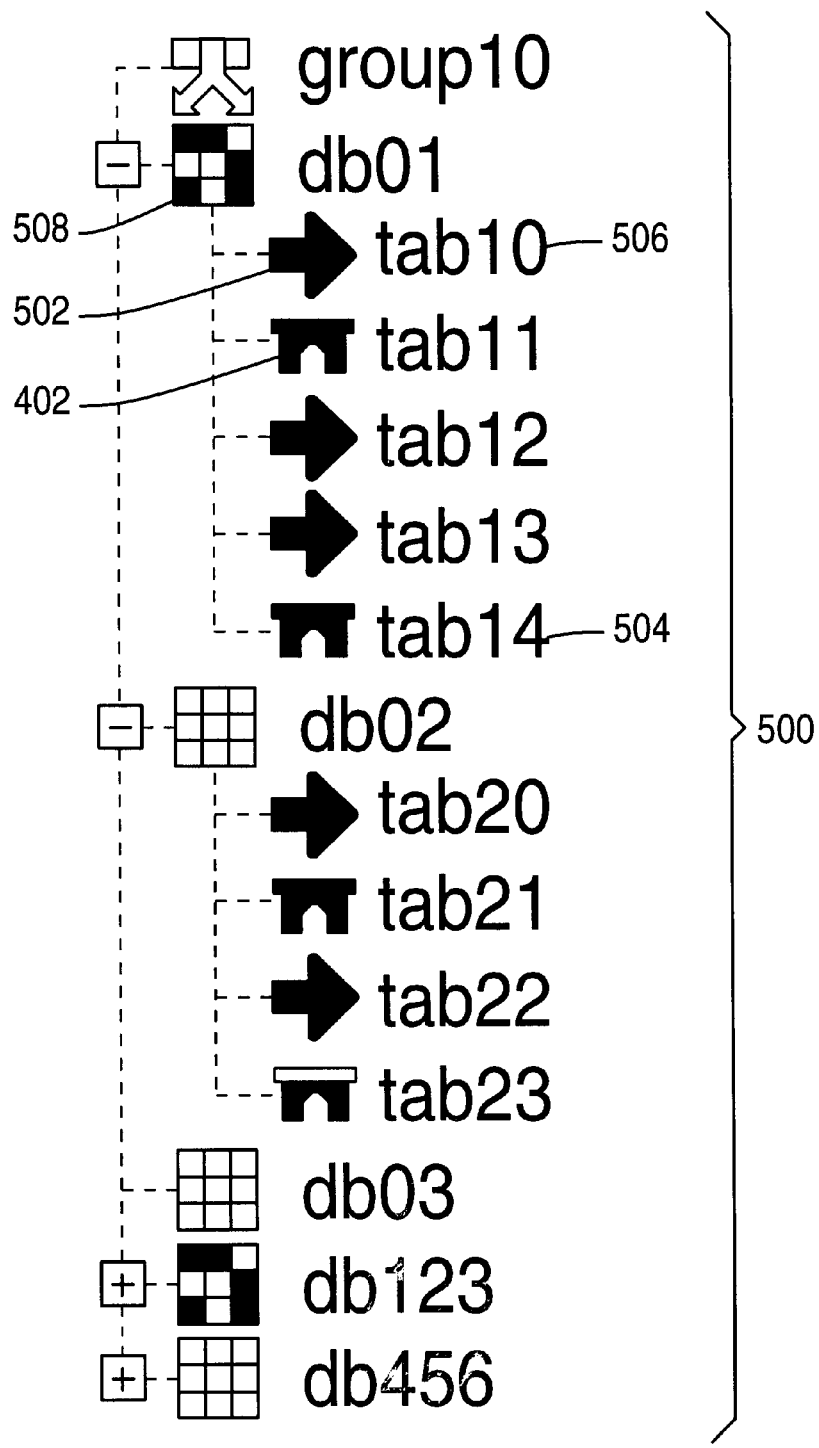
FIG. 5 illustrates tree control with tables selected according to the present invention.

FIG. 5 shows a tree control display 500 with several tables (i.e., "tab10", "tab12", "tab13", "tab20, "tab22") selected in two databases (i.e., "db01", "db02"). The tree control display 500 provides the user with two indications that tables have been selected. The table icon 402 is changed to a right-pointing arrow 502 that is opaque and the table name 504 is highlighted 506. The icon 508 for each database is partially darkened (i.e., 5 of the 9 component sub-squares are rendered opaque) to indicate that some, but not all, of the tables in that database have been selected.

Figure 6:
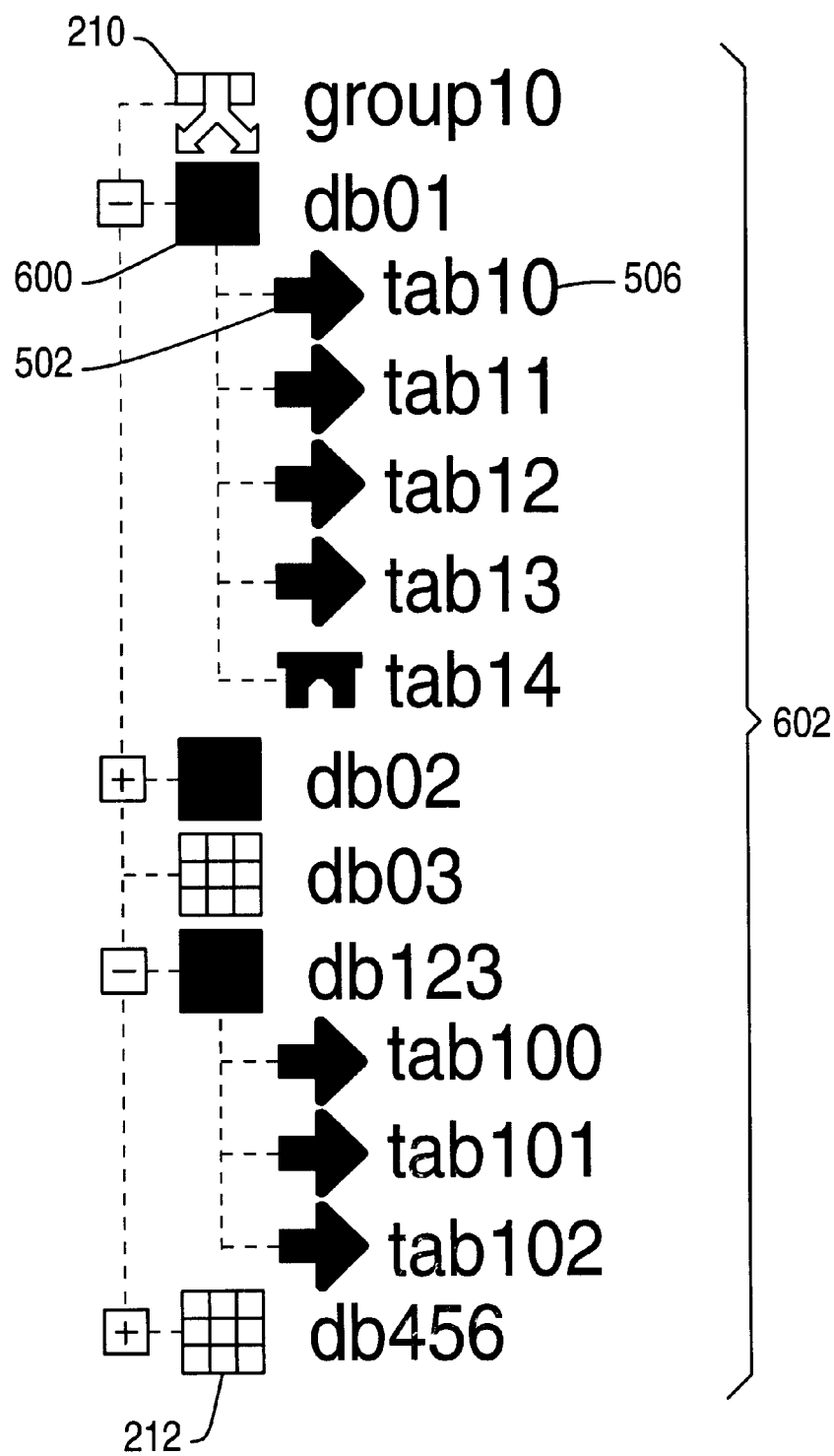
FIG. 6 illustrates tree control with all tables selected in two databases according to the present invention.

FIG. 6 shows a tree control display 602 with two expanded databases (i.e., "db01", "db123") with all tables selected. The database icons 600 are completely opaque, indicating that all eligible tables (i.e., "tab10", "tab11", "tab12", "tab13") are selected. The group icon 210 is not completely opaque because there remains a database (i.e., "db456") containing tables, none of which are selected, as indicated by the completely transparent database icon 212.

Figure 7:
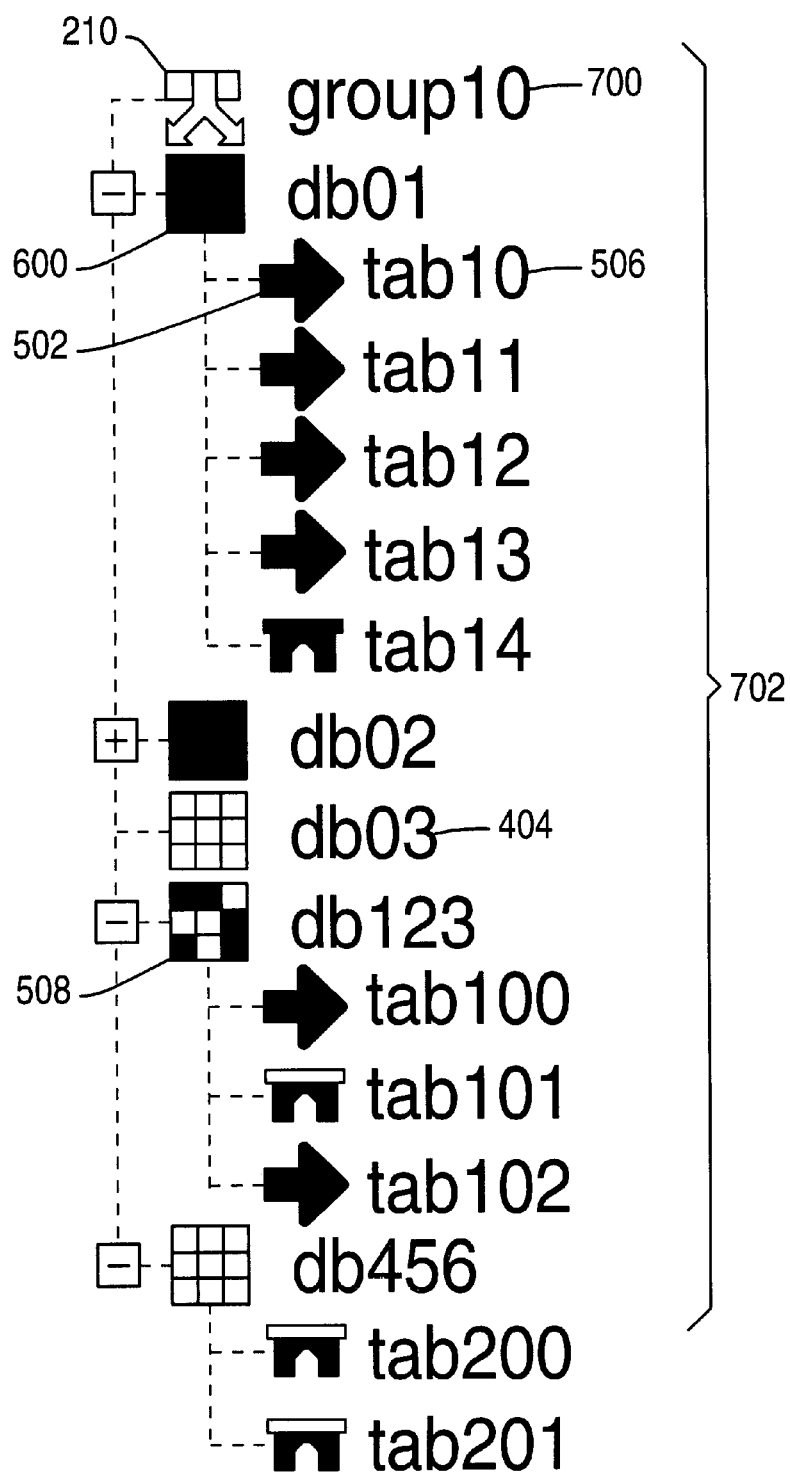
FIG. 7 illustrates tree control with varying table selection according to the present invention.

FIG. 7 shows a tree control display 702 in which two databases (i.e., "db01", "db02) are completely selected and another database (i.e., "db123") is partially selected. The database icon 600 for databases in which all eligible tables are selected is completely opaque, and the database icon 508 for the partially selected database is partially opaque. The user selects a table by clicking on the table name 506 or icon 502 and deselects the table by the same actions. The user selects all the eligible tables in a database by clicking on the database name 404 or icon 600 and deselects all tables in a database by the same actions. The user can also select all eligible tables in all databases by clicking on the group name 700 or icon 210 and deselect all tables by the same action.

Figure 8:
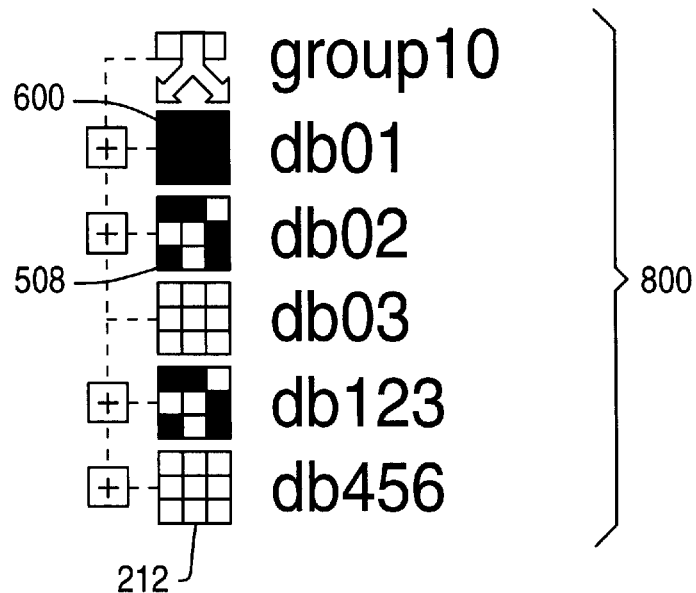
FIG. 8 illustrates tree control with varying table selection as in FIG. 7, except with database nodes collapsed according to the present invention.

The tree control display 800 of FIG. 8 shows that, if the database nodes are collapsed, the opacity of the database icons 212, 508, 600 is unchanged, indicating that the selection of tables is not affected by collapsing the database nodes. If the nodes are reexpanded, the selection states of the tables will be maintained.

Figure 9:
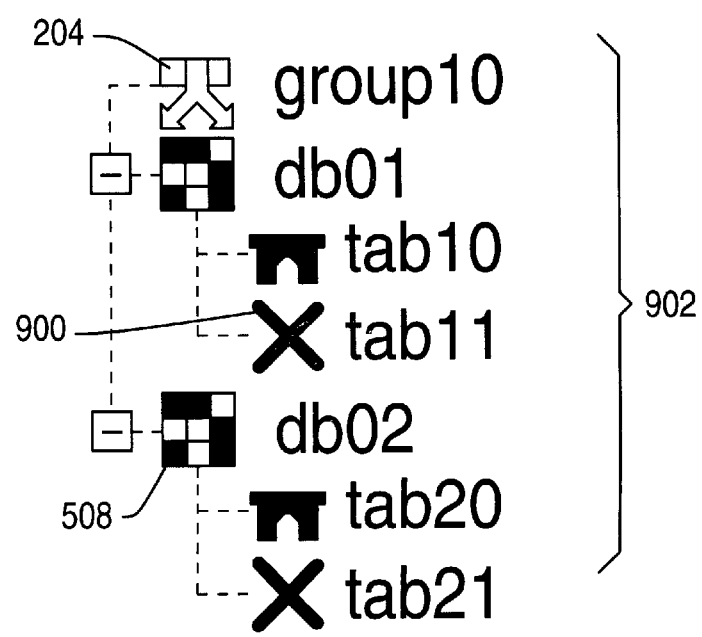
FIG. 9 illustrates tree control for removing tables according to the present invention.

FIG. 9 shows a tree control display 902 in which tables are to be removed or actions are to be terminated. In this example, the table selection icon 900 is an "X" instead of an arrow. Optionally, coloration of icons can also be used to indicate tables to be removed or actions to be terminated. In this example, the coloration of the group icon 204 and the database icon 508 would be red instead of green.

Replication Services

Replication services (RS) enable a user of a RDBMS to create copies of tables from one system (a "primary" system) on one or more other systems ("subscribers"). Updates on the primary system are fed to subscribers on a continual basis. Changed rows are fed to an RS support service via an RS gateway. RS support services move the changed rows between systems using Top End and other software. In an RS system, there is one RS gateway on each node. RS support services can run on one or more nodes on an RS system The RS comprises three components: replication groups, systems and tables. A replication group is a set of systems and tables and rules for which tables are to be replicated on which systems. A system is a RDBMS host. RS is operational where there is more than one system in an enterprise. An RS table can be in only one replication group. Some RS commands operate on a database, by operating on all tables in the database that are in the replication group.

To use RS, one or more systems are defined. A system definition consists of the system name and the nodes in the system to run RS support services. The user then defines replication groups by specifying a replication group name and a series of parameters. The user adds the primary and one or more subscriber systems to the replication group, and also adds tables to the replication group, specifying for each table which system(s) will replicate the table. Once the RS environment has been defined, the user administers the operation of RS with commands that initiate, terminate, resume and suspend RS activities, compare tables, etc.

A replication group has no state or status. A system has an RS status and a DBMS status. A system in a replication group has an RS state and a DBMS state. Nodes have status, and tables in replication groups have states. RS configuration and status data are stored.

Flowchart

Figure 10:
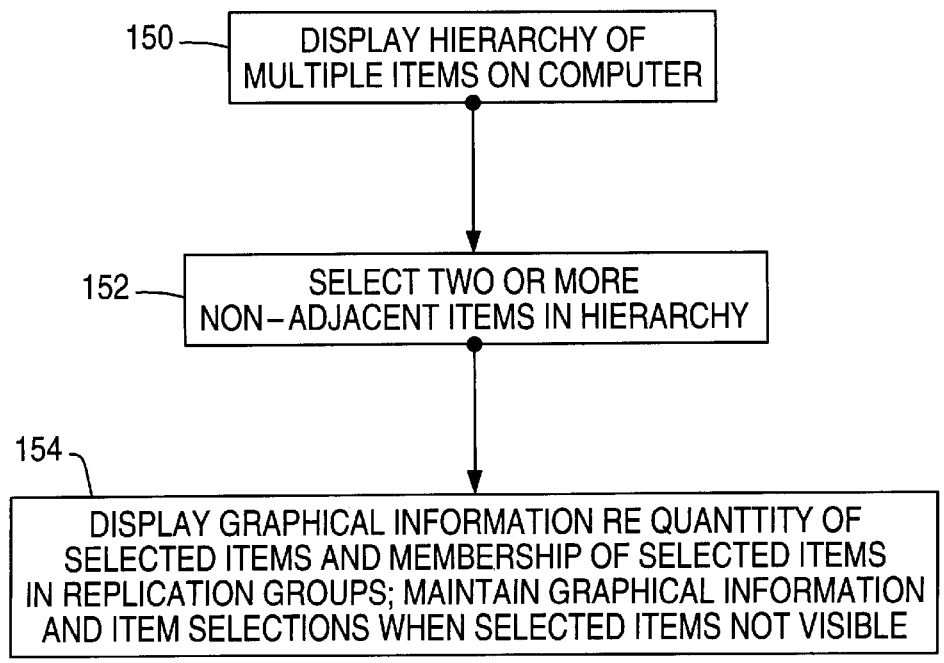
FIG. 10 is a flowchart illustrating the operation of the present invention.

FIG. 10 is a flowchart illustrating the operation of the present invention.

Block 150 represents the computer 102 displaying a hierarchy of multiple items on the monitor 108 connected to the computer 102.

Block 152 represents the selection of two or more non-adjacent items in the hierarchy. The selection can be initiated by a mouse click operation performed by the user.

Block 154 represents the computer 102 displaying graphical information on the monitor 108 connected to the computer 102. Block 156 represents the computer 102 determining the quantity of selected items (e.g., none, some or all of the eligible items in the group), determining the membership of the selected items in replication groups, and maintaining the graphical information and item selections when the selected items are not visible on the monitor. The graphical information denotes the quantity of selected items and membership of the selected items in replication groups.

Conclusion

This concludes the description of the preferred embodiment of the invention. The following paragraphs describe some alternative embodiments for accomplishing the same invention.

In one alternative embodiment, any type of computer, such as a mainframe, minicomputer, or personal computer, could be used to implement the present invention. In addition, any DBMS or other program that performs similar functions could be used.

In another alternative embodiment, the replication services need not be spread across separate systems or separate data storage devices. Instead, the replication services could store multiple copies of the same database or table on one or a few data storage devices of the same system.

In yet another alternative embodiment, different display methods other than those described herein could be used. For example, reverse-video, colors, fonts, text, graphical elements, or other methods known in the art can be used to denote the nature and status of commands and displayed elements.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for controlling database replication services in a computer, comprising:

(a) displaying a hierarchy representing a replication group on a monitor connected to a computer, wherein the hierarchy is comprised of a root group node, at least one database node within the root group node, and at least one table sub-node within the database node, and wherein the replication group comprises a set of rules governing replication of tables represented by the table sub-nodes across a plurality of computer systems;

(b) selecting one or more database nodes and one or more table sub-nodes from the hierarchy to identify the databases and tables upon which an action is to be performed across the plurality of computer systems;

(c) updating the displayed hierarchy to denote the selected database nodes and table sub-nodes; and (d) performing an action on the databases and tables represented by the selected database nodes and table sub-nodes in the displayed hierarchy across the plurality of computer systems, further comprising feeding updates to the databases and tables acted upon and represented by the selected database nodes and table sub-nodes in the displayed hierarchy on a continual basis.

2. The method of claim 1, wherein the action performed on the databases and tables comprises initiation, termination, resumption or suspension of replication services.

3. A method for selecting multiple items in a hierarchy having two or more levels and at least one replication group, wherein the items are replicatable on systems and the replication group comprises a set of rules governing the replication of items on systems, the method comprising the steps of:

(a) displaying a hierarchy of multiple items on a monitor connected to a computer;

(b) selecting two or more non-adjacent items in the hierarchy; and (c) displaying graphical information on the monitor, wherein the graphical information denotes the quantity of selected items and membership of the selected items in replication groups, wherein the graphical information and item selections are maintained when the selected items are not visible on the monitor.

4. The method of claim 3, wherein the items comprise tables.

5. The method of claim 4, wherein the tables are members of databases and the displayed graphical information further denotes the membership of the tables in the databases.

6. The method of claim 4, wherein the displayed graphical information comprises a table icon that represents a table.

7. The method of claim 6, wherein the table icon changes when the represented table is selected.

8. The method of claim 3, wherein the displayed graphical information comprises icons and text.

9. The method of claim 8, wherein a first icon represents a database and a second icon indicates the presence or absence of a table within the database.

10. The method of claim 3, wherein the selecting comprises selecting a replication group, and wherein selecting a replication group results in selecting all items that are members of the replication group.

11. The method of claim 3, wherein the selecting comprises selecting a database, and wherein selecting a database results in selecting all items that are members of a replication group.

12. The method of claim 3, wherein the displayed graphical information includes items that are not eligible for selection.

13. The method of claim 3, wherein the displayed graphical information comprises a database icon that represents a database.

14. The method of claim 13, wherein the database icon changes to a first image when all items within the database are selected and wherein the database icon changes to a second image when at least one, but less than all, items within the database are selected.

15. An apparatus for controlling database replication services in a computer, comprising:

(a) means for displaying a hierarchy representing a replication group on a monitor connected to a computer, wherein the hierarchy is comprised of a root group node, at least one database node within the root group node, and at least one table sub-node within the database node, and wherein the replication group comprises a set of rules governing replication of tables represented by the table sub-nodes across a plurality of computer systems;

(b) means for selecting one or more database nodes and one or more table sub-nodes from the hierarchy to identify the databases and tables upon which an action is to be performed across the plurality of computer systems;

(c) means for updating the displayed hierarchy to denote the selected database nodes and table sub-nodes; and (d) means for performing an action on the databases and tables represented by the selected database nodes and table sub-nodes in the displayed hierarchy across the plurality of computer systems, further comprising feeding updates to the databases and tables acted upon and represented by the selected database nodes and table sub-nodes in the displayed hierarchy on a continual basis.

16. The apparatus of claim 15, wherein the action performed on the databases and tables comprises initiation, termination, resumption or suspension of replication services.

17. A computerized apparatus for selecting multiple items in a hierarchy having two or more levels and at least one replication group, wherein the items are replicatable on systems and the replication group comprises a set of rules governing the replication of items on systems, comprising:

(a) means for displaying a hierarchy of multiple items on a monitor connected to a computer;

(b) means for selecting two or more non-adjacent items in the hierarchy; and (c) means for displaying graphical information on the monitor, wherein the graphical information denotes the quantity of selected items and membership of the selected items in replication groups, wherein the graphical information and item selections are maintained when the selected items are not visible on the monitor.

18. The apparatus of claim 17, wherein the items comprise tables.

19. The apparatus of claim 18, wherein the tables are members of databases and the displayed graphical information further denotes the membership of the tables in the databases.

20. The apparatus of claim 18, wherein the displayed graphical information comprises a table icon that represents a table.

21. The apparatus of claim 20, wherein the table icon changes when the represented table is selected.

22. The apparatus of claim 17, wherein the displayed graphical information comprises icons and text.

23. The apparatus of claim 22, wherein a first icon represents a database and a second icon indicates the presence or absence of a table within the database.

24. The apparatus of claim 17, wherein the selecting comprises selecting a replication group, and wherein selecting a replication group results in selecting all items that are members of the replication group.

25. The apparatus of claim 17, wherein the selecting comprises selecting a database, and wherein selecting a database results in selecting all items that are members of a replication group.

26. The apparatus of claim 17, wherein the displayed graphical information includes items that are not eligible for selection.

27. The apparatus of claim 17, wherein the displayed graphical information comprises a database icon that represents a database.

28. The apparatus of claim 27, wherein the database icon changes to a first image when all items within the database are selected and wherein the database icon changes to a second image when at least one, but less than all, items within the database are selected.

29. An article of manufacture comprising a program storage medium readable by a computer having a memory, the medium tangibly embodying one or more programs of instructions executable by the computer to perform method steps for controlling database replication services in a computer, the method comprising the steps of:

(a) displaying a hierarchy representing a replication group on a monitor connected to a computer, wherein the hierarchy is comprised of a root group node, at least one database node within the root group node, and at least one table sub-node within the database node, and wherein the replication group comprises a set of rules governing replication of tables represented by the table sub-nodes across a plurality of computer systems;

(b) selecting one or more database nodes and one or more table sub-nodes from the hierarchy to identify the databases and tables upon which an action is to be performed across the plurality of computer systems;

(c) updating the displayed hierarchy to denote the selected database nodes and table sub-nodes; and (d) performing an action on the databases and tables represented by the selected database nodes and table sub-nodes in the displayed hierarchy across the plurality of computer systems, further comprising feeding updates to the databases and tables acted upon and represented by the selected database nodes and table sub-nodes in the displayed hierarchy on a continual basis.

30. The article of manufacture of claim 29, wherein the action performed on the databases and tables comprises initiation, termination, resumption or suspension of replication services.

31. An article of manufacture comprising a program storage medium readable by a computer having a memory, the medium tangibly embodying one or more programs of instructions executable by the computer to perform method steps for selecting multiple items in a hierarchy having two or more levels and at least one replication group, wherein the items are replicatable on systems and the replication group comprises a set of rules governing the replication of items on systems, the method comprising the steps of:

(a) displaying a hierarchy of multiple items on a monitor connected to a computer;

(b) selecting two or more non-adjacent items in the hierarchy; and (c) displaying graphical information on the monitor, wherein the graphical information denotes the quantity of selected items and membership of the selected items in replication groups, wherein the graphical information and item selections are maintained when the selected items are not visible on the monitor.

32. The article of manufacture of claim 31, wherein the items comprise tables.

33. The article of manufacture of claim 32, wherein the tables are members of databases and the displayed graphical information further denotes the membership of the tables in the databases.

34. The article of manufacture of claim 33, wherein the table icon changes when the represented table is selected.

35. The article of manufacture of claim 32, wherein the displayed graphical information comprises a table icon that represents a table.

36. The article of manufacture of claim 31, wherein the displayed graphical information comprises icons and text.

37. The article of manufacture of claim 36, wherein a first icon represents a database and a second icon indicates the presence or absence of a table within the database.

38. The article of manufacture of claim 31, wherein the selecting comprises selecting a replication group, and wherein selecting a replication group results in selecting all items that are members of the replication group.

39. The article of manufacture of claim 31, wherein the selecting comprises selecting a database, and wherein selecting a database results in selecting all items that are members of a replication group.

40. The article of manufacture of claim 31, wherein the displayed graphical information includes items that are not eligible for selection.

41. The article of manufacture of claim 31, wherein the displayed graphical information comprises a database icon that represents a database.

42. The article of manufacture of claim 41, wherein the database icon changes to a first image when all items within the database are selected and wherein the database icon changes to a second image when at least one, but less than all, items within the database are selected.

* * * * *